US011175939B2

(12) United States Patent
Kumatagi et al.

(10) Patent No.: US 11,175,939 B2
(45) Date of Patent: Nov. 16, 2021

(54) DYNAMICALLY CHANGING CONTAINERIZED WORKLOAD ISOLATION IN RESPONSE TO DETECTION OF A TRIGGERING FACTOR

(71) Applicant: International Business Machines Corporation, Armonk, NY (US)

(72) Inventors: Manjunath Kumatagi, Bangalore (IN); Harshal Patil, Bangalore (IN); Pradipta Banerjee, Bangalore (IN); Hemant Shaw, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 16/408,359

(22) Filed: May 9, 2019

(65) Prior Publication Data

US 2020/0356397 A1 Nov. 12, 2020

(51) Int. Cl.
*G06F 9/455* (2018.01)
*H04L 12/751* (2013.01)

(52) U.S. Cl.
CPC .......... *G06F 9/45558* (2013.01); *H04L 45/02* (2013.01); *G06F 2009/4557* (2013.01); *G06F 2009/45587* (2013.01)

(58) Field of Classification Search
CPC ......... G06F 9/45558; G06F 2009/4557; G06F 2009/45587; H04L 45/02
See application file for complete search history.

(56) References Cited

U.S. PATENT DOCUMENTS 9,575,797 B2 2/2017 Linton et al.
9,753,762 B1 9/2017 Emelyanov
(Continued)

FOREIGN PATENT DOCUMENTS

CN 106030602 A 10/2016

OTHER PUBLICATIONS

Unknown, "Kernel Local Privilege Escalation "Dirty Cow"—CVE-2016-5195", 16 pages, printed from <https://access.redhat.com/security/vulnerabilities/DirtyCow> on May 9, 2019.
(Continued)

*Primary Examiner* — Emerson C Puente
*Assistant Examiner* — Jonathan R Labud
(74) *Attorney, Agent, or Firm* — Matthew J. Bussan

(57) ABSTRACT

Method, apparatus, and computer program product are provided for dynamically changing containerized workload isolation in response to detection of a triggering factor. In some embodiments, workload is containerized using a default container runtime (e.g., runC) that spawns one or more cgroup-based containers on a compute node using resource limiting capabilities of the compute node's host kernel including cgroups and namespaces. In some embodiments, in response to a triggering factor, such as a host kernel vulnerability, at least some of the containerized workload is migrated from running in the one or more cgroup-based containers to one or more virtual machines (VMs) launched by a standby container runtime (e.g., runV). In some embodiments, the cgroups and namespaces of the one or more cgroup-based containers are live migrated, without service interruption, to one or more VM runtimes on the one or more VMs using CRIU—checkpoint/restore in userspace.

17 Claims, 10 Drawing Sheets

(56) References Cited

U.S. PATENT DOCUMENTS

| | | |
|---|---|---|
| 2015/0278512 A1 | 10/2015 | Dewan et al. |
| 2016/0277249 A1 | 9/2016 | Singh et al. |
| 2016/0323199 A1 | 11/2016 | Bryant et al. |
| 2016/0378525 A1 | 12/2016 | Bjorkengren |
| 2016/0378563 A1 | 12/2016 | Gaurav et al. |
| 2018/0032410 A1 | 2/2018 | Kang et al. |
| 2018/0046457 A1 | 2/2018 | Branca |
| 2018/0053001 A1 | 2/2018 | Folco et al. |
| 2018/0157517 A1 | 6/2018 | Dong et al. |
| 2018/0260574 A1 | 9/2018 | Morello et al. |
| 2018/0276215 A1 | 9/2018 | Chiba et al. |
| 2018/0285164 A1 | 10/2018 | Hu et al. |
| 2019/0004917 A1 | 1/2019 | Gao et al. |
| 2019/0235906 A1* | 8/2019 | Asawa .................. G06F 9/4875 |
| 2019/0332413 A1* | 10/2019 | Nijhawan ............ G06F 9/45533 |

OTHER PUBLICATIONS

Mell et al., "The NIST Definition of Cloud Computing," National Institute of Standards and Technology, NIST Special Publication 800-145, Sep. 2011, 7 pages.

Naresh, Kotikalapudi Sai Venkat, "Comparing Live Migration between Linux Containers and Kernel Virtual Machines", thesis submitted to the Faculty of Computing at Blekinge Institute of Technology in partial fulfillment of the requirements for the degree of Master of Science in Computer Science, 42 pages, downloaded from <http://www.diva-portal.org/smash/get/diva2:1085809/FULLTEXT02.pdf> on Jan. 22, 2019.

ISR/WO (International Search Report/Written Opinion) in International Application No. PCT/IB2020/054210 dated Aug. 17, 2020.

\* cited by examiner

DYNAMICALLY CHANGING CONTAINERIZED WORKLOAD ISOLATION IN RESPONSE TO DETECTION OF A TRIGGERING FACTOR

BACKGROUND

The present invention relates in general to the field of information processing. More particularly, the present invention relates to dynamically changing the isolation of containerized workload in response to detection of a triggering factor.

SUMMARY

Embodiments of the present disclosure include a method, apparatus, and computer program product for dynamically changing containerized workload isolation in response to detection of a triggering factor, such as a perceived threat and/or a change in compliance requirement. For example, containerized workload isolation may be increased to dynamically respond to a changing threat level of the host operating system running the containerized workload. In some embodiments, workload is containerized using a default container runtime (e.g., runC) that spawns one or more cgroup-based containers on a compute node using resource limiting capabilities of the compute node's host kernel including cgroups and namespaces. In some embodiments, in response to a perceived threat, such as a host kernel vulnerability, at least some of the containerized workload is migrated from running in the one or more cgroup-based containers to one or more virtual machines (VMs) launched by a standby container runtime (e.g., runV). In some embodiments, the cgroups and namespaces of the one or more cgroup-based containers are live migrated, without service interruption, to one or more VM runtimes on the one or more VMs using CRIU—checkpoint/restore in userspace.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
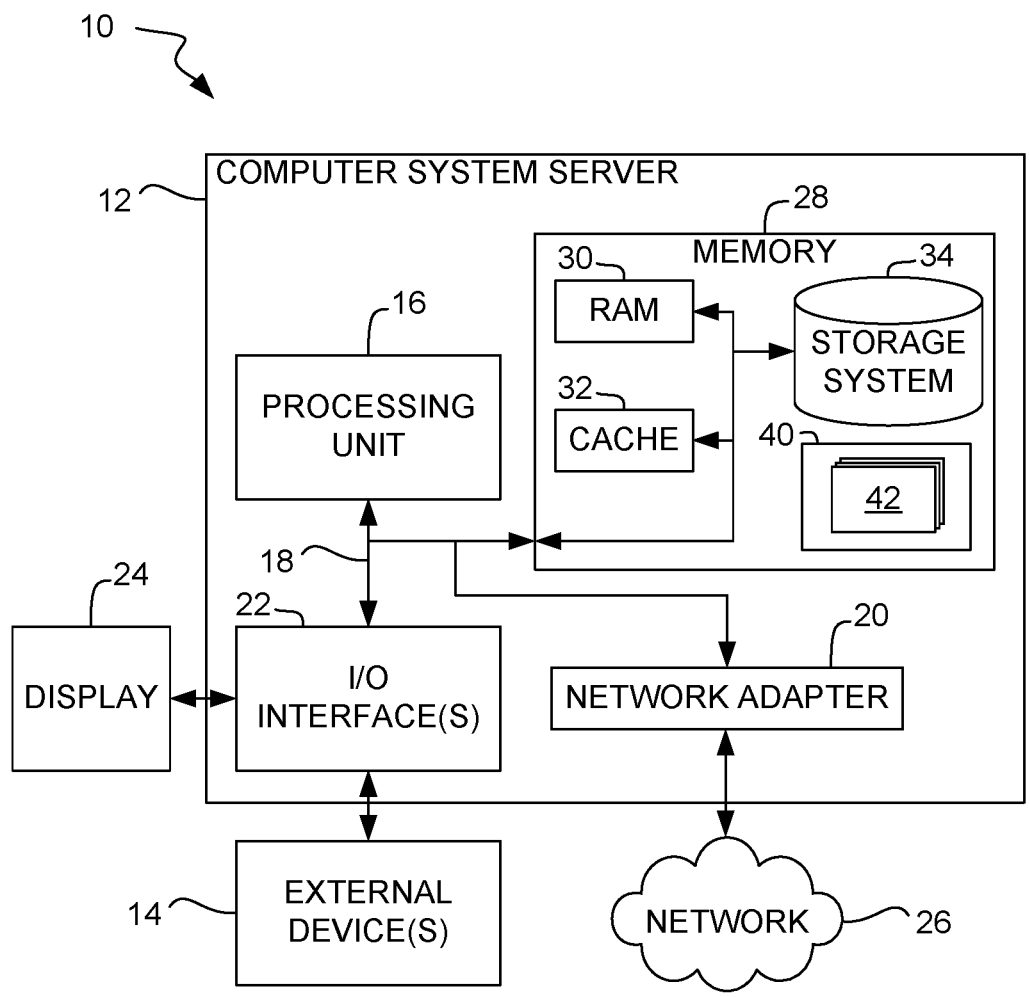
FIG. 1 depicts a cloud computing node, according to one or more embodiments.

An emerging information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside a virtual server, or so-called "virtual machines" (VMs), that are mapped onto physical servers in a data center facility. The virtual machines typically run on top of a hypervisor, which is a control program that allocates physical resources to the virtual machines. Modern hypervisors often use hardware-assisted virtualization, which provides efficient and full virtualization by using virtualization-specific hardware capabilities, primarily from the host CPUs.

Operating system (OS) level virtualization is another approach to virtualization. OS-level virtualization allows the resources of a computer to be partitioned via the operating system kernel's support for multiple isolated user space instances, which are usually called containers. Hence, this approach to virtualization is often referred to as container-based virtualization. More generally, OS-level virtualization includes, but is not limited to, "Containers" on Linux, "Jails" on FreeBSD, and "Zones" on Solaris. Containers may be implemented via, for example, Linux Containers (LXC), Docker, and CoreOS Rocket (rkt). Containers may be indistinguishable from separate machines to the end users. Container-based virtualization (e.g., Docker) is widely used in cloud environments. In many of today's data centers, for example, workloads run inside containers. Containers can offer better agility and orchestration for changing demand from the workload. Many technologies are used in container-based virtualization. These technologies include, for example, namespace and cgroups, discussed below.

In a representative container cloud computer environment, a host executes an operating system, such as the Linux kernel. The terminology "Containers", as noted above, refers to an OS-level virtualization mechanism for running isolated computing workloads (containers) on a control host using a single operating system kernel. The approach effectively partitions the resources managed by the single operating system into isolated groups to better balance the conflicting demands on resource usage between isolated groups. In contrast to other types of virtualization, neither instruction-level emulation nor just-in-time compilation is required. In addition, containers can run instructions native to the core CPU without any special interpretation mechanisms. By providing a way to create and enter containers, an operating system gives applications the illusion of running on a separate machine while at the same time sharing many of the underlying resources.

The Linux kernel has a feature referred to as "namespaces". Linux kernel namespaces, which are the major building block of Linux containers, isolate applications within different "userspaces" such as networks, processes, users, and file systems. A namespace isolates and virtualizes system resources for a collection of processes. Some examples of resources that can be virtualized include process IDs, host-names, user IDs, and the like. A namespace typically refers to namespace types, as well as to specific instances of these types. A Linux operating system is initialized with a single instance of each namespace type. After initialization, additional namespaces can be created or joined.

The Linux kernel also provides a functionality called Control Groups, also known as "cgroups", that allows limitation and prioritization of resources (CPU, memory, block I/O, network, etc.). The cgroups functionality limits various host resources such as CPU count and usage, disk performance, memory, and other process limits.

Container technology combines the kernel's support of cgroups and namespaces to provide isolated execution environments for applications.

Containers share the kernel with the host operating system. Accordingly, containers can potentially be used to exploit various kernel vulnerabilities. If the host kernel is comprised with a vulnerability, the host kernel vulnerability may create a security hole where containers could get unprivileged access to other containers or the host system. A good example of such a vulnerability is the Kernel Local Privilege Escalation "Dirty COW" (CVE-2016-5195). There are known exploits that allow a malicious user to "escape" a container and gain access to the kernel and other containers. No doubt, additional host kernel vulnerabilities and attendant exploits will continue to be discovered.

Solutions to address this problem have heretofore been unsatisfactory. One such approach involves isolating container execution using one or more virtual machines. In this approach, the container workloads are launched inside one or more virtual machines instead of regular cgroups-based containers. However, virtual machines are typically slower and more resource intensive than cgroups-based containers. Consequently, this approach (i.e., to run the workload always inside one or more virtual machines) leads to severe resource wastage.

In accordance with one or more embodiments, containerized workload isolation is dynamically changed based on detection of a trigger factor, such as a perceived threat and/or a change in compliance requirement. For example, containerized workload isolation may be increased to dynamically respond to a changing threat level of the host operating system running the containerized workload. In one or more embodiments, workload is containerized using a default container runtime (e.g., runC) that spawns one or more cgroup-based containers on a compute node using resource limiting capabilities of the compute node's host kernel including cgroups and namespaces. In one or more embodiments, in response to a perceived threat (e.g., a host kernel vulnerability) or other trigger factor (e.g., a compliance requirement change), at least some of the containerized workload is migrated from running in the one or more cgroup-based containers to one or more virtual machines (VMs) launched by a standby container runtime (e.g., runV). In some embodiments, the cgroups and namespaces of the one or more cgroup-based containers are live migrated, without service interruption, to one or more VM runtimes on the one or more VMs using CRIU—checkpoint/restore in userspace.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Containers as a Service (CaaS) is a cloud computing service model that allows users to deploy and manage containers, applications, and clusters through container-based virtualization. CaaS generally lies between Infrastructure as a Service (IaaS) and Platform as a Service (PaaS), both of which are described above, on the spectrum of cloud computing service models. Typically, however, CaaS is considered a subset of IaaS, but the CaaS includes containers as its fundamental resource (as opposed to a virtual machine or a bare metal hardware host system traditionally used to support IaaS environments).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 18 by one or more data media interfaces. As will be further described below, memory 28 may include a computer program product storing a set (e.g., at least one) of program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 are adapted to generally carry out the one or more functions and/or methodologies of one or more embodiments of the present invention.

Computer system/server 12 may also communicate with one or more external devices 14 such as a keyboard, a pointing device, a display 24, etc.; one or more devices that enable a user to interact with computer system/server 12; and/or any device (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, the network adapter 20 communicates with other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
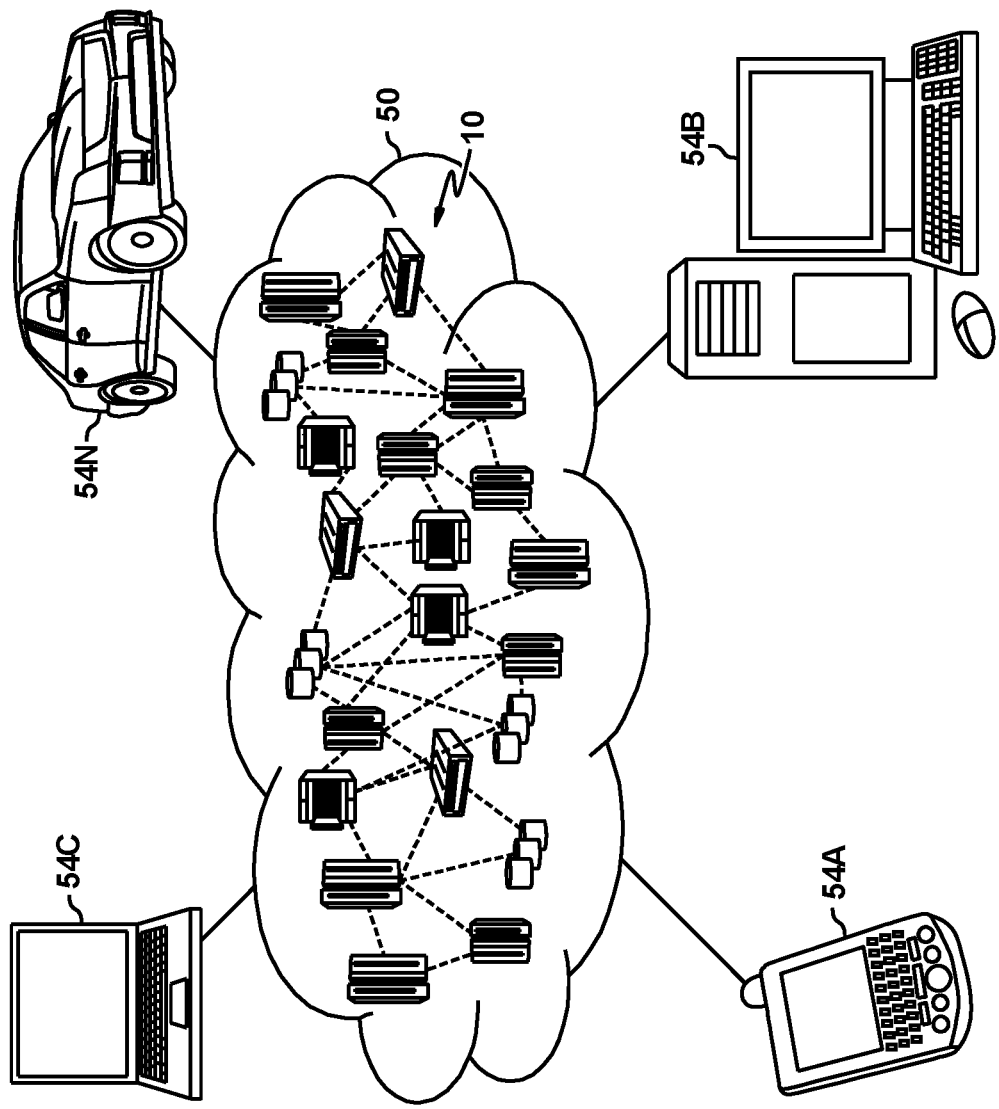
FIG. 2 depicts a cloud computing environment, according to one or more embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
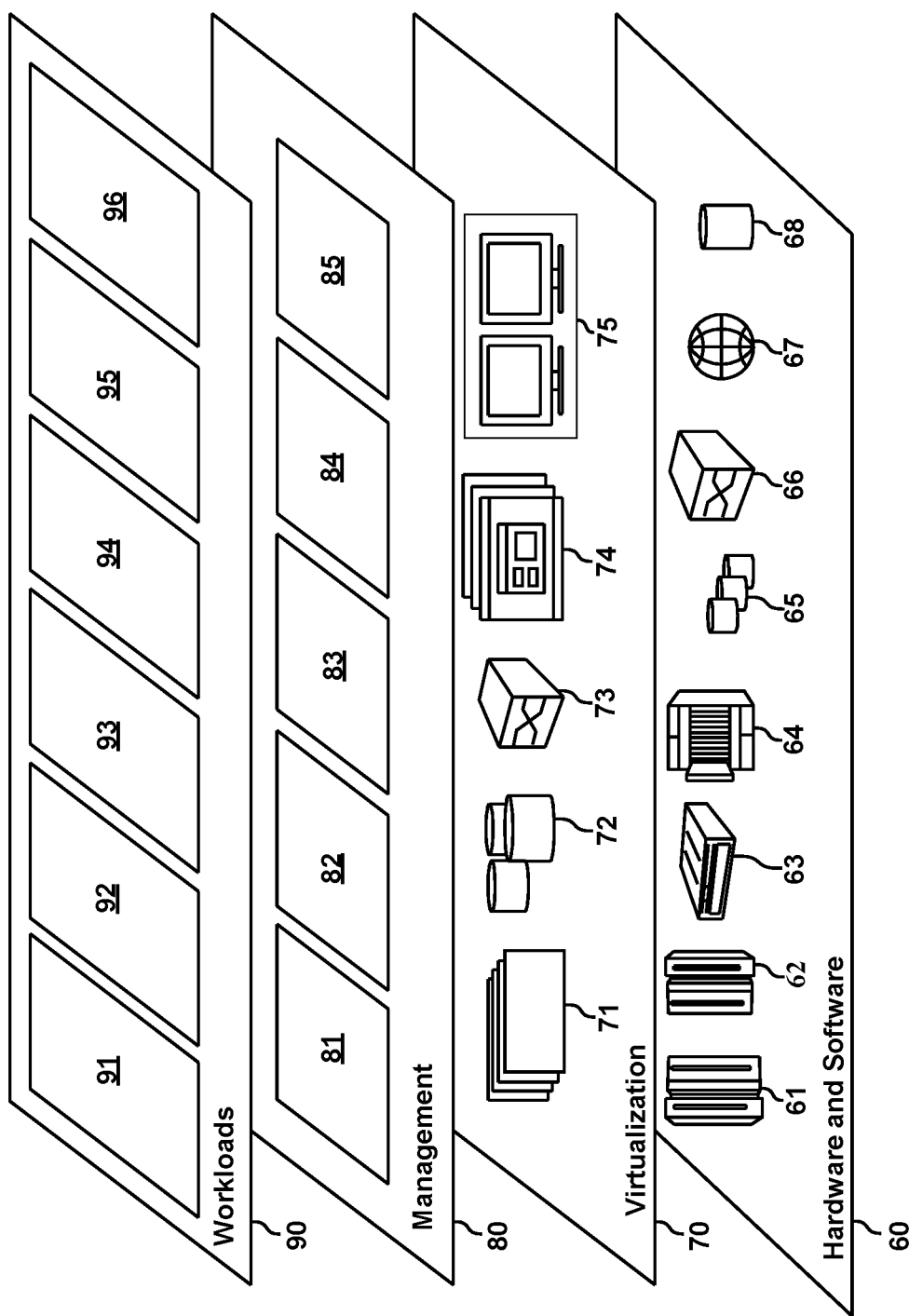
FIG. 3 depicts abstraction model layers, according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 4:
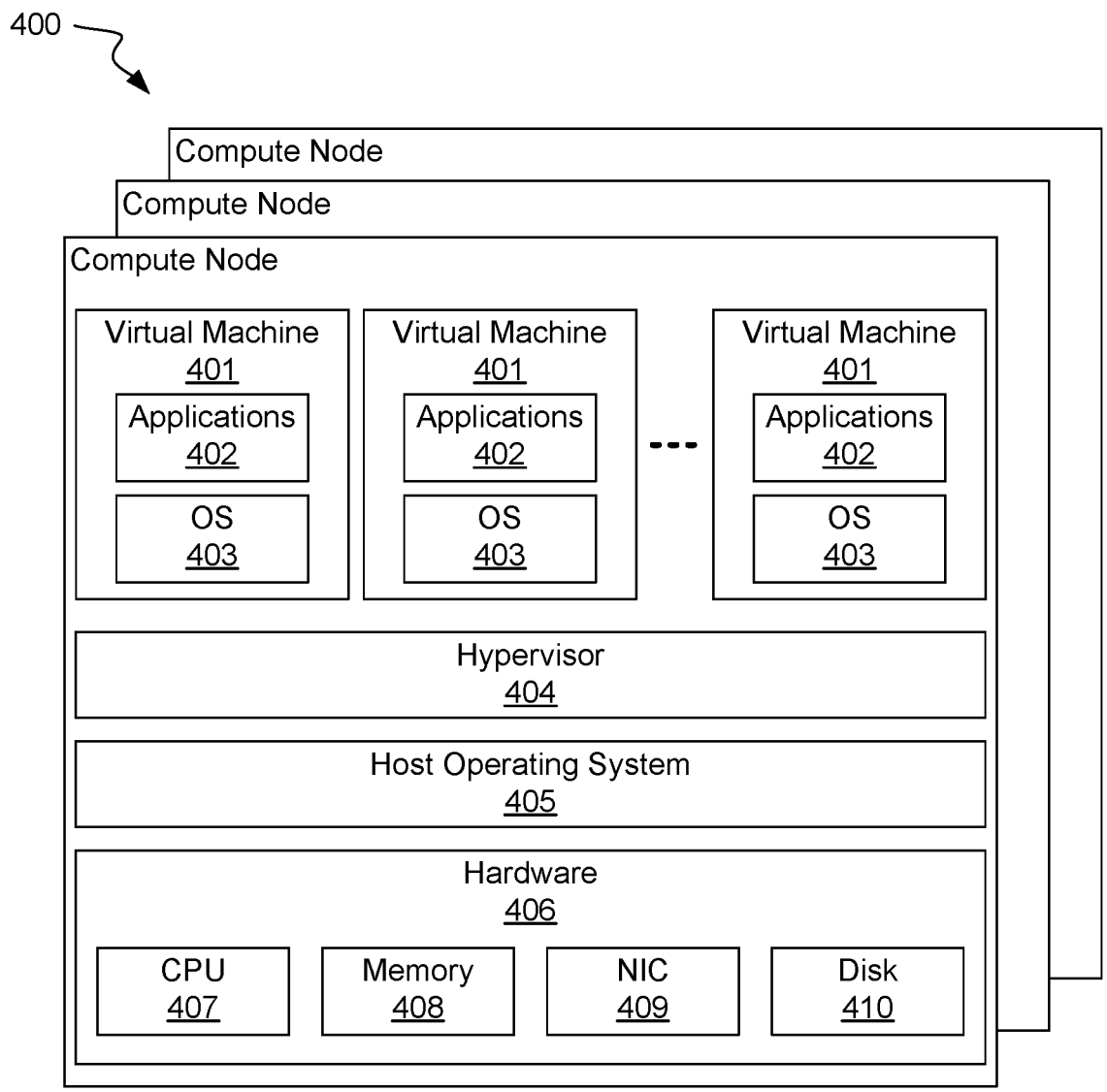
FIG. 4 illustrates a plurality of compute nodes at least one of which includes a plurality of virtual machines, according to one or more embodiments.
Figure 5:
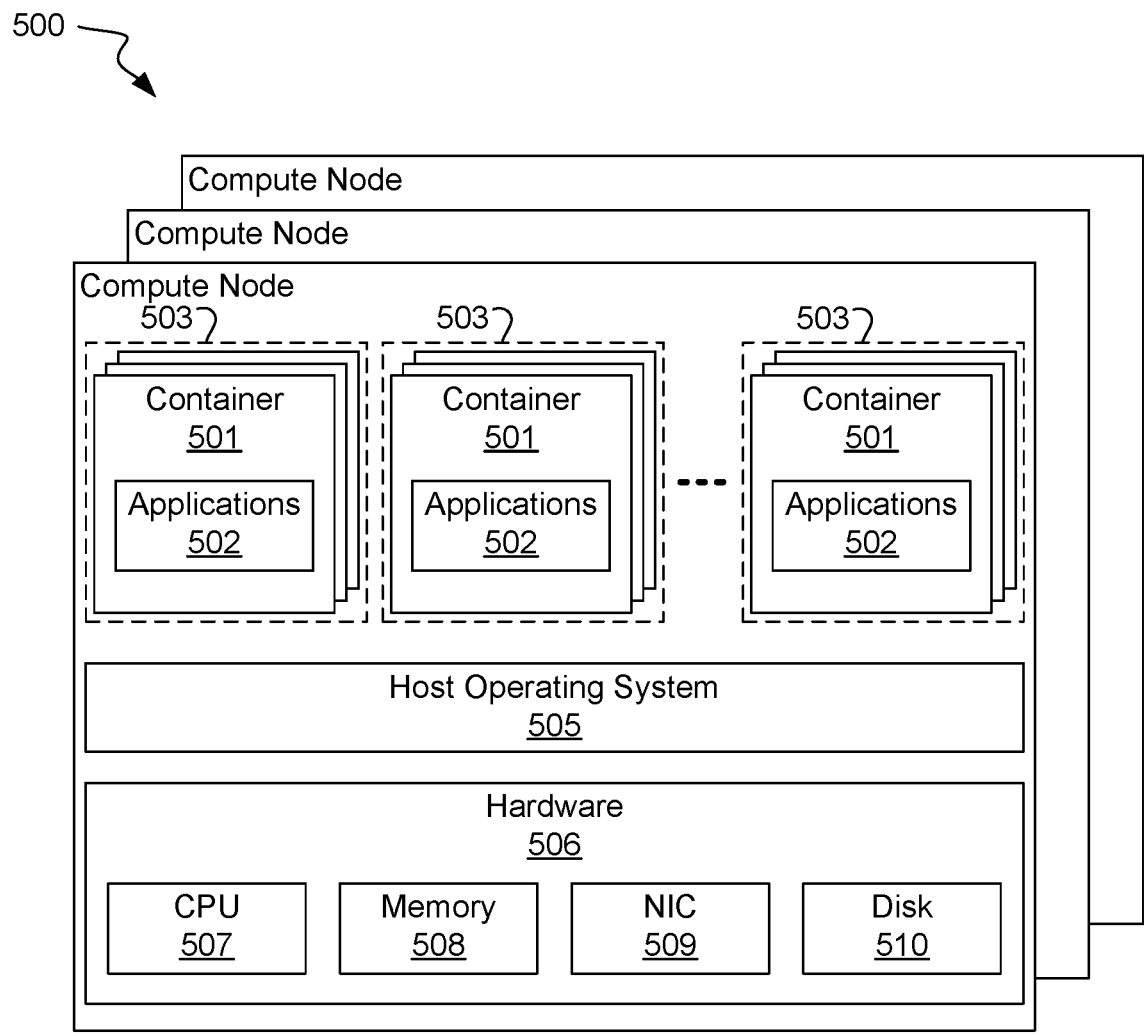
FIG. 5 illustrates a plurality of compute nodes at least one of which includes a plurality of containers, according to one or more embodiments.

FIGS. 4 and 5 illustrate a plurality of compute nodes 400 and 500 (also referred to as "host devices"), respectively, that may be used in accordance with some embodiments of the present invention. The compute nodes 400 of FIG. 4 include a plurality of exemplary system VMs, or full virtualization VMs, that provide a complete substitute for the targeted real machine and a level of functionality required for the execution of a complete operating system 403. The compute nodes 500 of FIG. 5 include a plurality of exemplary OS-level virtualization systems that allow the resources of a computer to be partitioned via the kernel's support for multiple isolated user space instances, which are usually called containers and may look and feel like real machines to the end users. Some embodiments of the present invention may be used with various types of virtualization. For example, some embodiments of the present invention may be used with management for virtual machines (such as OpenStack) and management for containers (such as Kubernetes).

For example, container management systems (e.g., Kubernetes, Docker Swarm) may be utilized for managing container lifecycle (Create, Read, Update, and Delete (CRUD) in a cluster-wide system. As a typical example, once a container creation request is received, a scheduler selects the host where requested container will run. Then, an agent in the selected host launches the container. It is to be appreciated that the terms "host" and "node" are used interchangeably herein to refer to a hardware apparatus or hardware system involving at the least, a processor, a memory, and a communication mechanism for interacting with other hosts/nodes.

FIGS. 4 and 5 show compute nodes 400 and 500, respectively, using full virtualization and OS-level virtualization. Some embodiments of the present invention may be used with any of these types of compute nodes, as well as in hybrid environments with combinations of these compute nodes across single or multiple compute nodes.

As illustrated in FIG. 4, each of the compute nodes 400 includes hardware 406 that may include processors (or CPUs) 407, memory 408, network interface cards (NICs) 409, and disk drives 410. The disk drives 410 may include solid state drives or hard disk drives or some combination of the two. On the hardware, the compute nodes 400 run a host operating system 405. The compute nodes 400 also include a hypervisor 404 to share and manage the hardware 406, allowing multiple different environments 401, isolated from each other, to be executed on the same physical machine 400. The hypervisor 404 may use hardware-assisted virtualization, which provides efficient and full virtualization by using virtualization-specific hardware capabilities, primarily from the host CPUs 407. Each compute node 400 includes one or more virtual machines 401 each of which includes a guest operating system 403 and one or more application programs (or applications) 402 running on the guest operating system 403.

Similarly, as illustrate in FIG. 5, each of the compute nodes 500 includes hardware 506 that may include processors (or CPUs) 507, memory 508, network interface cards (NICs) 509, and disk drives 510. The disk drives 510 may include solid state drives or hard disk drives or some combination of the two. On the hardware, the compute nodes 500 run a host operating system 505. Each compute node 500 includes one or more containers 501 each of which includes one or more applications 502.

In accordance with some embodiments, the compute node 500 may include one or more pods 503 each of which includes one or more containers 501 each of which includes one or more applications 502. In Kubernetes, for example, containers run in a pod.

"Kubernetes" is a portable, extensible open-source platform for managing containerized workloads and services. It facilitates both declarative configuration and automation. The Kubernetes project was open-sourced by Google in 2014. Kubernetes orchestrates computing, networking, and storage infrastructure on behalf of user workloads. Kubernetes is an example of an orchestration framework. Other orchestration frameworks include, but are not limited to, Docker Swarm, LXD, Rancher, and Apache Aurora/Mesos.

Containerized workload in a plurality of compute nodes may be managed by a container orchestration manager (COM). An example of a container orchestration manager (COM) is the Kubernetes Master.

Several binary components (e.g., master components, node components, and addons) are utilized to deliver a functioning Kubernetes cluster.

Master components provide the Kubernetes cluster's control plane (also referred to as "Kubernetes control plane"). Master components may include, but are not limited to, kube-apiserver, etcd, kube-scheduler, kube-controller-manager, and cloud-controller-manager. Master components make global decisions about the Kubernetes cluster. For example, master components handle scheduling. In addition, master components are utilized in detecting and responding to cluster events. For example, master components are responsible for starting up a new pod when a replication controller's "replicas" field is unsatisfied. Master components can be run on any machine in the cluster. Nonetheless, set up scripts typically start all master components on the same machine, and do not run user containers on that machine.

Node components run on every compute node in the Kubernetes cluster. Node components are responsible for maintaining running pods and providing the Kubernetes runtime environment. Node components may include, but are not limited to, kubelet, kube-proxy, and container runtime.

Kubelet is an agent that makes sure that containers are running in a pod. The kubelet ensures that the containers specified in a set of PodSpecs provided through various mechanisms are running and healthy.

Kube-proxy is a network proxy. The kube-proxy enables the Kubernetes service abstraction by maintaining network rules on the compute node and performing connection forwarding.

Container runtime is software responsible for running containers. More specifically, a container runtime is the node component that handles the lifecycle of a container. The container runtime implements basic concepts such as creating, starting, stopping, and removing a container workload. Kubernetes supports several runtimes including, but not limited to, Docker, containerd, CRI-O, and rktlet.

More generally, Kubernetes supports any implementation of the Container Runtime Interface (CRI) provided by Kubernetes. CRI enables a variety of container runtimes to be plugged in easily. Prior to the introduction of CRI in Kubernetes 1.5, only the default Docker image repository was used and its default OCI-compatible runtime, runC. The Open Container Initiative (OCI) created a runtime specification that details the API for an OCI-compatible container runtime. runC, runV, and Intel's Clear Containers (also known as "cc-runtime) are examples of OCI-compatible container runtimes. runC has built-in support for CRIU—checkpoint/restore in userspace, described below, to checkpoint and restore a container. runV is a hypervisor-based Docker runtime for OCI. runV is also referred to as "Hyper runV".

CRI runtimes are at a higher level of abstraction and should not be confused with an OCI-compatible runtime. A CRI runtime is also referred to as a "CRI shim". CRI shims include cri-containerd, CRI-O, dockershim, and frakti. Some CRI shims (e.g., cri-containerd, CRI-O, and dockershim) call into an OCI-compatible runtime, while others (e.g., frakti) are a monolithic solution.

At least some CRI shims support multiple runtimes running on a single compute node. For example, CRI-O supports the concept of a trusted and an untrusted sandbox. In Kubernetes, a mix of one or more VM-based pods and one or more cgroup/namespace-based pods may be run on a single compute node based on pod annotations and default CRI-O configuration. Containers running inside a VM-based pod may be isolated and managed via namespaces and cgroups, similar to what is done by runC.

Addons are pods and services that are responsible for implementing cluster features. Addons include, but are not limited to, cluster DNS (i.e., a DNS server which serves DNS records for Kubernetes services), Dashboard (i.e., web-based UI for Kubernetes clusters that allows users to manage and troubleshoot applications running in the cluster, as well as the cluster itself), Container Resource Monitoring (i.e., responsible for recording generic time-series metrics about containers in a central database, as well as providing a UI for browsing the data recorded in that database), and Cluster-level Logging (i.e., responsible for saving container logs to a central log store with a search/browse interface).

In accordance with one or more embodiments, live migration of containerized workload from one runtime (e.g., runC) to another (e.g., runV) may be accomplished without service interruption using features of CRIU. Generally, CRIU provides the ability to freeze the state of a running container in a source and restore the container in a destination in the same running state. A CRIU process typically includes the following operations: 1) synchronize (pre-freeze/dump) the container's file system between the source and destination; 2) at the source, freeze the processes of the container; 3) at the source, dump the container (to a dump file, e.g., in a checkpoint directory); 4) synchronize (post-freeze/dump) the container's file system between the source and the destination; 5) at the destination, copy the dump file; 6) at the destination, restart the container; 7) at the destination, resume the frozen processes of the container; 8) at the source, stop the container; and 9) at the source, destroy the container.

Figure 6:
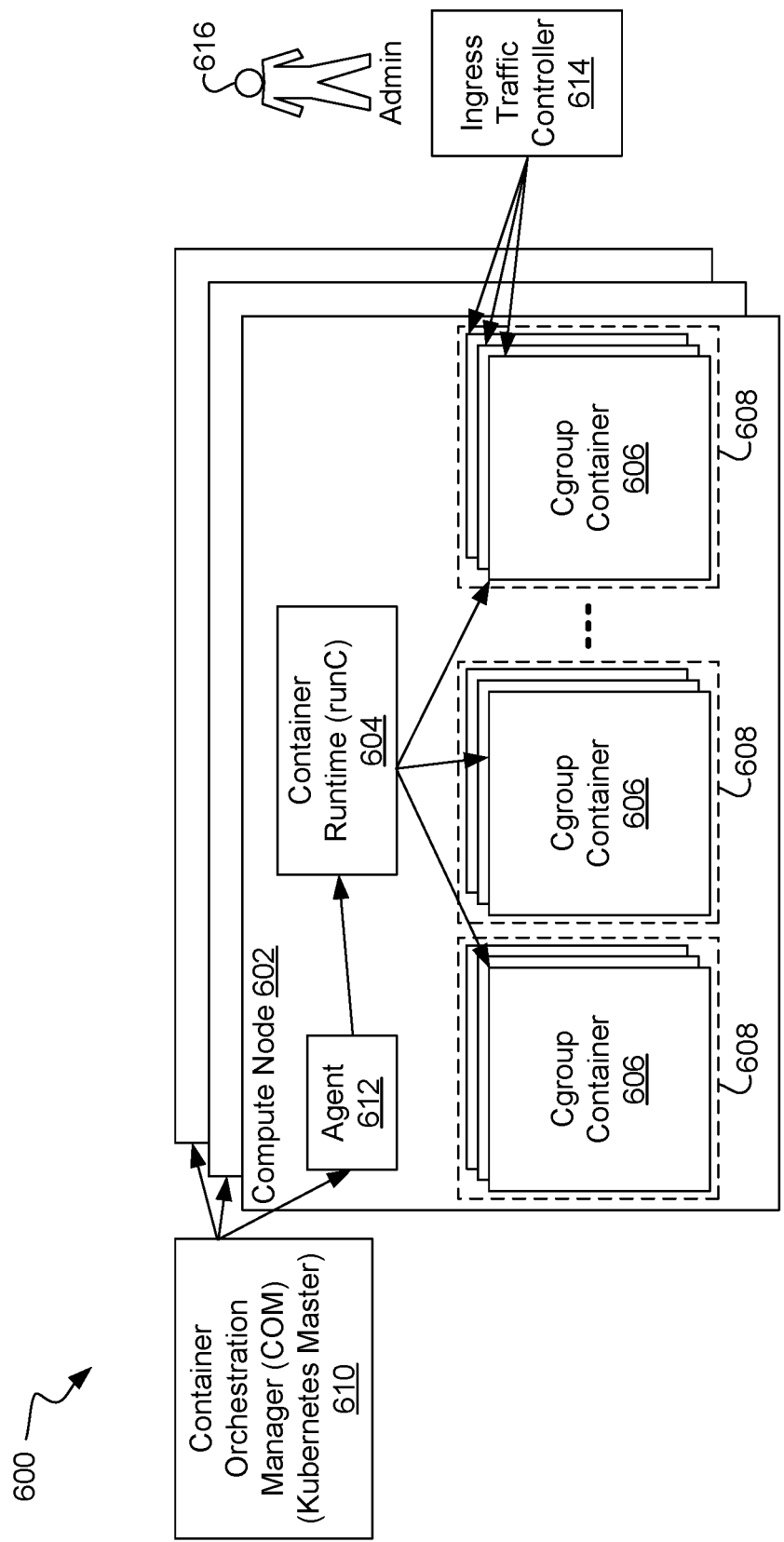
FIG. 6 illustrates a container orchestration system that includes a plurality of compute nodes at least one of which includes a container runtime (e.g., runC) that launches a plurality of containers, according to one or more embodiments.

FIG. 6 illustrates a container orchestration system 600 that includes a plurality of compute nodes 602 at least one of which includes a container runtime (e.g., runC) 604 that launches a plurality of containers 606, according to one or more embodiments. The container orchestration system 600 may also be referred to as a cluster (e.g., the container orchestration system 600 may correspond to a Kubernetes cluster). The compute nodes 602 may be managed by a container orchestration manager (COM) 610. In Kubernetes, for example, each compute node 602 contains services (i.e., node components) necessary to run one or more pods 608 and is managed by Kubernetes master components. The services on each compute node 602 may include the container runtime 604 (e.g., runC), an agent 612 (e.g., kubelet) which listens for the instructions from the container orchestration manager (COM) 610 with regard to container lifecycle operations to be performed on that compute node, and a network proxy (e.g., kube-proxy). The container orchestration manager (COM) 610 may include at least a portion of one or more of the Kubernetes master components.

The container runtime 604 (e.g., runC) manages one or more containers 606 at a compute node level. The container orchestration manager (COM) 610 manages each container runtime 604 (e.g., runC) at a distributed system (Kubernetes cluster) level (i.e., manages one or more container runtimes (e.g., runCs)).

By definition, containers 606 are spawned on the compute node 602 using resource limiting capabilities of the compute node's host kernel, such as cgroups and namespaces, using the container runtime 604 (e.g., runC). runC is a command-line tool for spawning and running containers according to the Open Container Initiative (OCI) specification. runC is a lightweight universal container runtime and uses Linux cgroups and namespaces to provide isolation.

runC is an example of an OCI-compatible container runtime. One skilled in the art will appreciate that other container runtimes may be used in lieu of, or in addition to, runC. For example, runC may be used in conjunction with a CRI runtime (CRI shim), such as CRI-O, that calls into runC.

In the embodiment illustrated in FIG. 6, the container orchestration system 600 includes an Ingress traffic controller 614. While the Ingress traffic controller 614 is shown in FIG. 6 separate from the container orchestration manager (COM) 610, the container orchestration manager (COM) 610 and the Ingress traffic controller 614 may run on the same machine. The Ingress traffic controller 614 may be configured by an administrator 616.

In Kubernetes, Ingress is an API object that manages access to services within a Kubernetes cluster from outside the Kubernetes cluster. Access can be configured by creating a collection of rules (referred to as "routing rules") that define which inbound connections reach which Kubernetes services within the cluster. Traffic routing is controlled by the routing rules defined on an Ingress resource. Routing rules are typically consolidated into one place (referred to as an "Ingress resource"). Ingress can, for example, provide load balancing, SSL termination, and name-based routing. Ingress exposes HTTP and HTTPS routes from outside the cluster to services within the cluster.

An Ingress controller, such as the Ingress traffic controller 614 illustrated in FIG. 6, is responsible for fulfilling the Ingress. For example, Google Compute Engine (GCE)/Google Kubernetes Engine (GKE) deploys an Ingress controller on the master. In environments other than GCE/GKE, any of a number of Ingress controllers (e.g., Nginx Ingress Controller) are available for deployment.

Figure 7:
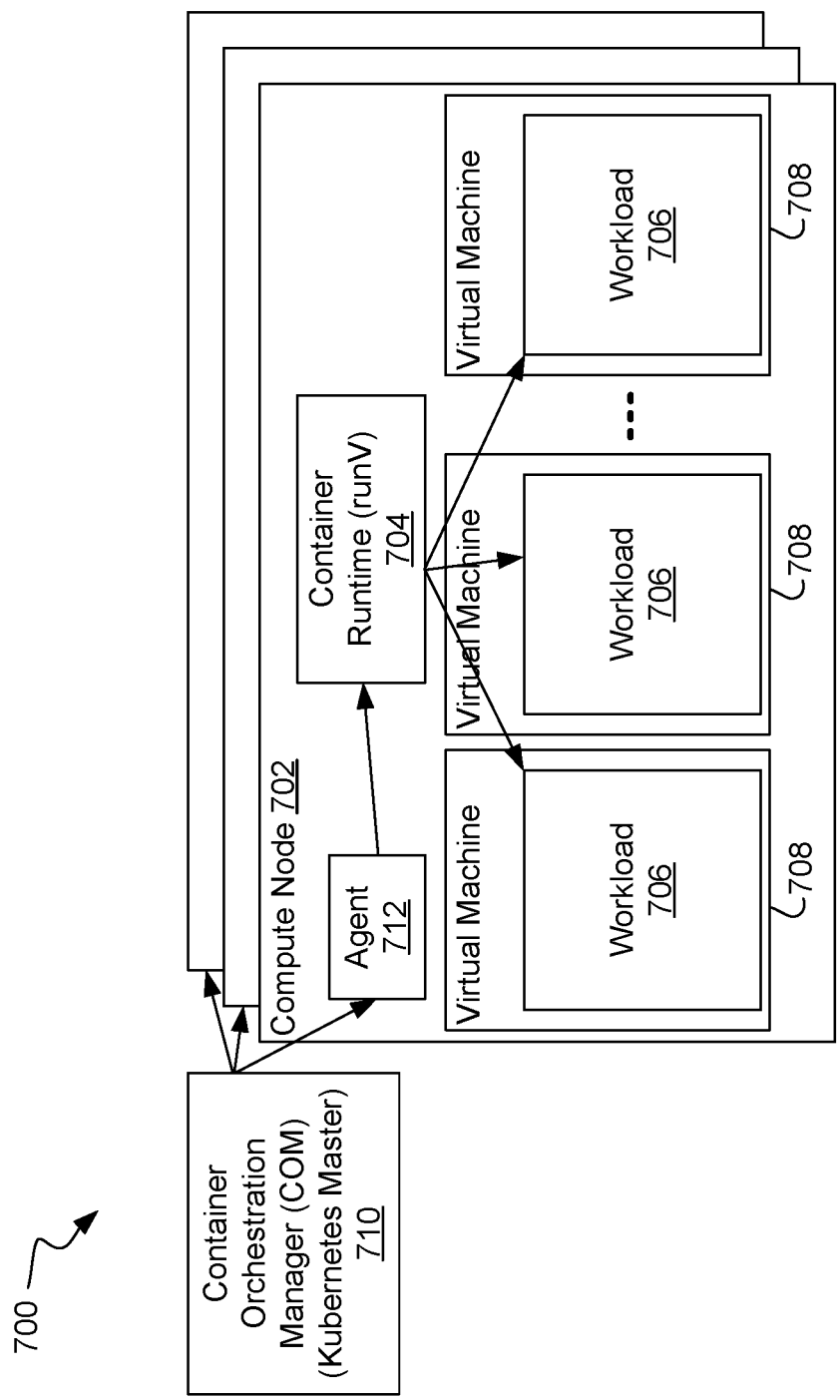
FIG. 7 illustrates a container orchestration system that includes a plurality of compute nodes at least one of which includes a container runtime (e.g., runV) modified to launch a workload in a plurality of traditional virtual machines instead of a container created using cgroups and namespaces, according to one or more embodiments.

FIG. 7 illustrates a container orchestration system 700 that includes a plurality of compute nodes 702 at least one of which includes a container runtime 704 (e.g., runV) modified to launch a workload 706 in a plurality of traditional virtual machines 708 instead of a container created using cgroups and namespaces, according to one or more embodiments. This type of setup is useful, for example, where the workload 706 is of very critical nature (e.g., financial transactions and hyperledger blockchain validating) and needs to be protected from kernel vulnerabilities such as "Dirty COW". The container orchestration system 700 may also be referred to as a cluster (e.g., the container orchestration system 700 may correspond to a Kubernetes cluster). The compute nodes 702 may be managed by a container orchestration manager (COM) 710. In Kubernetes, for example, each compute node 702 contains services (i.e., node components) necessary to run one or more pods and is managed by Kubernetes master components. The services on each compute node 702 may include the container runtime 704 (e.g., runV or other hypervisor-based runtime implementations of the OCI runtime specification), an agent 712 (e.g., kubelet) which listens for the instructions from the container orchestration manager (COM) 710 with regard to container lifecycle operations to be performed on that compute node, and a network proxy (e.g., kube-proxy). The container orchestration manager (COM) 710 may include at least a portion of one or more of the Kubernetes master components.

The container runtime 704 (e.g., runV) manages the workload 706 at a compute node level. The container orchestration manager (COM) 710 manages each container runtime 704 (e.g., runV) at a distributed system (Kubernetes cluster) level (i.e., manages one or more container runtimes (e.g., runVs)).

Hyper runV (also referred to as "runV") is a hypervisor-based runtime for OCI runtime (i.e., an OCI-compatible runtime), which functions similarly to runC. Unlike runC, however, runV does not use cgroups and namespaces, but a hypervisor to run the (Docker) image. One skilled in the art will appreciate that other hypervisor-based runtime implementations of the OCI runtime specification may be used in lieu of, or in addition to, runV. Hypervisor-based runtimes, such as runV, are also referred to herein as "VM based container runtimes". Other examples of hypervisor-based runtime implementations of the OCI runtime specification include, but are not limited to, Intel's Clear Containers (also known as "cc-runtime) and VMWare's VSphere Integrated Containers (VIC). Moreover, runV and other hypervisor-based runtime implementations of the OCI runtime specification may be used in conjunction with a CRI runtime (CRI shim), such as CRI-O, that calls into the hypervisor-based runtime.

Figure 8:
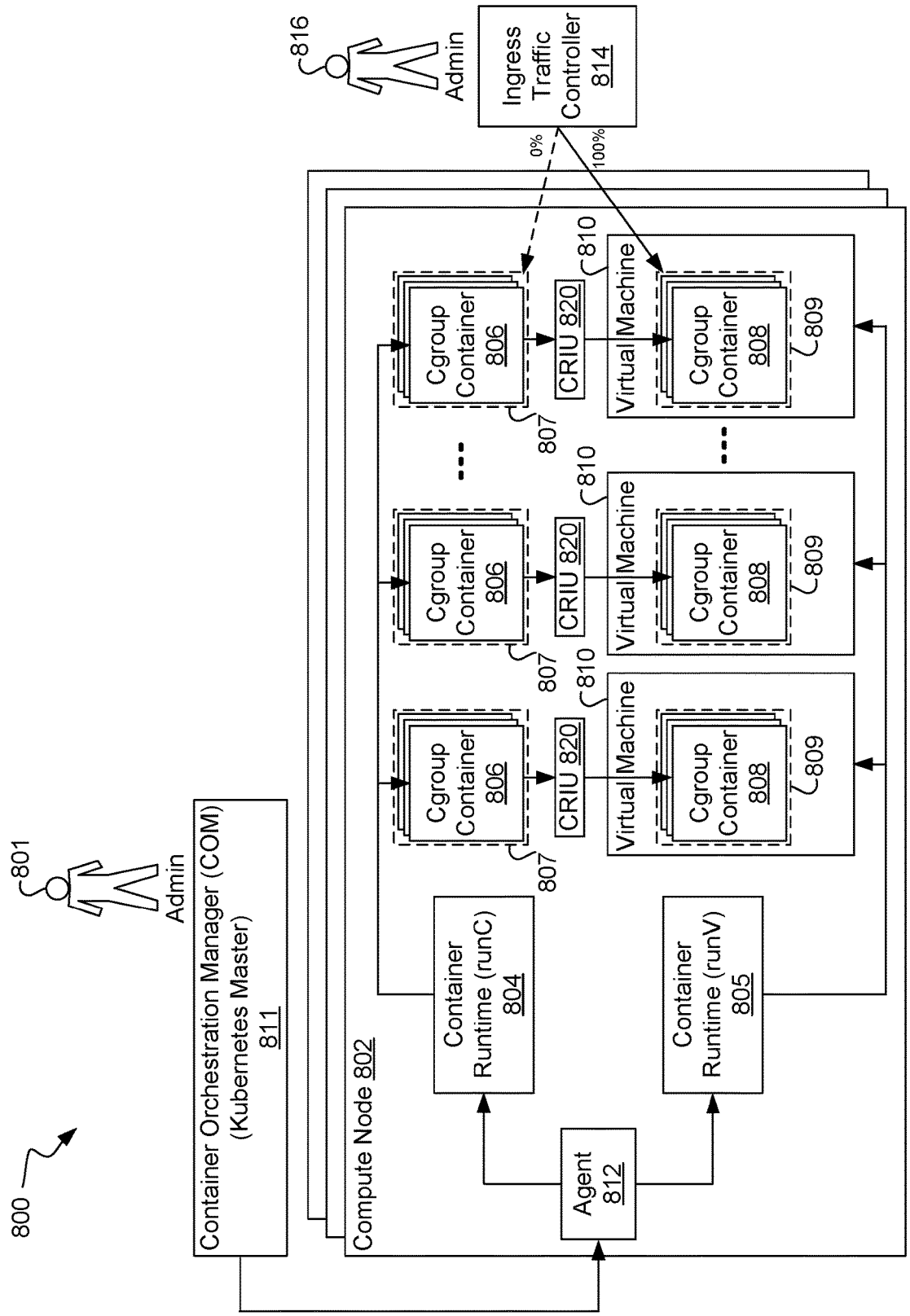
FIG. 8 illustrates a container orchestration system that includes a plurality of compute nodes at least one of which includes a plurality of running containers, a hypervisor-based container runtime (e.g., runV) capable of launching a plurality of virtual machines, and checkpoint/restore in userspace (CRIU) utilized, in response to detection of a triggering factor, to live migrate the cgroups and namespaces of the running containers from the host to the plurality of virtual machines, according to one or more embodiments.

FIG. 8 illustrates a container orchestration system 800 that includes a plurality of compute nodes 802 at least one of which includes a plurality of running containers 806, a hypervisor-based container runtime 805 (e.g., runV) capable of launching a plurality of virtual machines 810, and checkpoint/restore in userspace (CRIU) 820 that is utilized, in response to detection of a triggering factor, to live migrate the cgroups and namespaces of the running containers 806 from the host 802 to the plurality of virtual machines 810, according to one or more embodiments. Live migration of the cgroups and namespaces from host 802 to the plurality of virtual machines 810 establishes cgroup based containers 808 running on the plurality of virtual machines 810.

In accordance with one or more embodiments, a Container Orchestration Manager (COM) 811 may be configured (e.g., by an administrator 801) to respond to detection of a triggering factor by initiating either a complete migration mode or a partial migration mode. For example, depending upon the triggering factor that is detected, an administrator 801 on the COM 811 may choose a complete migration mode that moves the complete workload from regular cgroup and namespace based container runtimes to VM based container runtimes, or may choose a partial migration mode that horizontally scales containers across regular cgroup and namespace based container runtimes and VM based container runtimes by leveraging load balancing.

For example, workloads running in cgroup based containers can migrate in response to detection of a triggering factor such as a host kernel vulnerability. In some embodiments, this migration can occur without incurring service interruption. One skilled in the art will appreciate, however, that workloads running in cgroup based container may be migrated in response to detection of one or more other triggering factors in lieu of, or in addition to, host kernel vulnerabilities. This approach can also be used, for instance, in scenarios where a compliance requirement of a running service needs to be changed without interrupting service uptime.

The container runtime 804 (e.g., runC) manages the containers 806 at a compute node level. The container runtime 804 (e.g., runC) is also referred to herein as a "default container runtime".

The hypervisor-based container runtime 805 (e.g., runV) manages the containers 808 at a compute node level. The hypervisor-based container runtime 805 (e.g., runV) is also referred to herein as a "standby container runtime".

The container orchestration manager (COM) 811 manages each container runtime 804 (e.g., runC) and each hypervisor-based container runtime 805 (e.g., runV) at a distributed system (Kubernetes cluster) level (i.e., manages one or more container runtimes 804 (e.g., runCs) and one or more hypervisor-based container runtimes (e.g., runVs)).

The checkpoint command checkpoints (i.e., the "C" in CRIU) the current state of the container on the host the container is currently running on. In its default configuration, runC writes the checkpoint data to a directory called checkpoint. The checkpoint contains all necessary information to restore all the processes in the container to the same state those processes were during the checkpoint. This checkpoint data includes open files, memory content, and the file system. This checkpoint data also includes cgroups and namespaces. In accordance with one or more embodiments, once all the checkpoint data has been written to the checkpoint directory by runC, the container can be restored on a VM launched by runV. The restore command reads the checkpoint data from the checkpoint directory and restores (i.e., the "R" in CRIU) all the processes in the container to the same state those processes were during the checkpoint.

Checkpointing the runtime state of a container, in accordance with one or more embodiments, may include temporarily pausing a running container, and capturing and storing both the container's in-memory data and the filesystem state in local disk. In an exemplary implementation, CRIU may be used to pause and dump the in-memory data of a container in the format of a set of image files and snapshot the filesystem of the container to capture the on-disk state of the container.

Referring to FIG. 8, a container 806 is instantiated and runs on a host 802. The container 806 includes container memory data and a container filesystem. Upon checkpointing, data from the container 806 may be stored to a local disk (e.g., disk 510 in FIG. 5). The data includes the container memory data and the container file system. In one exemplary embodiment, memory data can be stored to /var/lib/container/CONTAINER-ID/statesSTATE-ID/MEM-ID, and a filesystem can be stored to /var/lib/container/CONTAINER-ID/statesSTATE-ID/FS-ID.

The container orchestration system 800 may also be referred to as a cluster (e.g., the container orchestration system 800 may correspond to a Kubernetes cluster). The compute nodes 802 may be managed by a container orchestration manager (COM) 811. In Kubernetes, for example, each compute node 802 contains services (i.e., node components) necessary to run one or more pods 807, 809 and is managed by Kubernetes master components. The services on each compute node 802 may include the container runtime 804 (e.g., runC), the hypervisor-based container runtime 805 (e.g., runV), an agent 812 (e.g., kubelet) which listens for the instructions from the container orchestration manager (COM) 811 with regard to container lifecycle operations to be performed on that compute node, and a network proxy (e.g., kube-proxy). The container orchestration manager (COM) 811 may include at least a portion of one or more of the Kubernetes master components.

In the embodiment illustrated in FIG. 8, the plurality of running containers 806 are cgroup based containers launched by a container runtime 804 (e.g., runC). By definition, containers 806 are spawned on the compute node 802 using resource limiting capabilities of the compute node's host kernel, such as cgroups and namespaces, using the container runtime 804 (e.g., runC). runC is a command-line tool for spawning and running containers according to the Open Container Initiative (OCI) specification. runC is a lightweight universal container runtime and uses Linux cgroups and namespaces to provide isolation.

runC is an example of an OCI-compatible container runtime. One skilled in the art will appreciate that other container runtimes may be used in lieu of, or in addition to, runC. For example, runC may be used in conjunction with a CRI runtime (CRI shim), such as CRI-O, that calls into runC.

runV is a hypervisor-based Docker runtime from Hyper (The Hyper.sh Team) for OCI runtime (i.e., an OCI-compatible runtime), which functions similarly to runC. Unlike runC, however, runV does not use cgroups and namespaces, but a hypervisor to run the (Docker) image. Although runV is a hypervisor-based Docker runtime, it is hypervisor-agnostic. For example, runV is capable of using existing hypervisors such as KVM, Xen, and ESXi. One skilled in the art will appreciate that other hypervisor-based runtime implementations of the OCI runtime specification may be used in lieu of, or in addition to, runV. Other examples of hypervisor-based runtime implementations of the OCI runtime specification include, but are not limited to, Intel's Clear Containers (also known as "cc-runtime) and VMWare's VSphere Integrated Containers (VIC). Moreover, runV and other hypervisor-based runtime implementations of the OCI runtime specification may be used in conjunction with a CRI runtime (CRI shim), such as CRI-O, that calls into the hypervisor-based runtime.

In the embodiment illustrated in FIG. 8, the container orchestration system 800 includes an Ingress traffic controller 814. The Ingress traffic controller 814 may be configured by an administrator 816. For example, in the embodiment illustrated in FIG. 8, the administrator 816 may configure the Ingress traffic controller 814 to reroute the ingress traffic (originally destined for the regular cgroup and namespace based container runtimes) to the VM based container runtimes without affecting service uptime.

While the Ingress traffic controller 814 is shown in FIG. 8 separate from the container orchestration manager (COM) 811, the container orchestration manager (COM) 811 and the Ingress traffic controller 814 may run on the same machine. In some embodiments, the container orchestration manager (COM) 811 and the Ingress traffic controller 814 may be configured by the same administrator.

In Kubernetes, Ingress is an API object that manages access to services within a Kubernetes cluster from outside the Kubernetes cluster. Access can be configured by creating a collection of rules (referred to as "routing rules") that define which inbound connections reach which Kubernetes services within the cluster. Traffic routing is controlled by the routing rules defined on an Ingress resource. Routing rules are typically consolidated into one place (referred to as an "Ingress resource"). Ingress can, for example, provide load balancing, SSL termination, and name-based routing. Ingress exposes HTTP and HTTPS routes from outside the cluster to services within the cluster.

An Ingress controller, such as the Ingress traffic controller 814 illustrated in FIG. 8, is responsible for fulfilling the Ingress. For example, Google Compute Engine (GCE)/Google Kubernetes Engine (GKE) deploys an Ingress controller on the master. In environments other than GCE/GKE, any of a number of Ingress controllers (e.g., Nginx Ingress Controller) are available for deployment.

Figure 9:
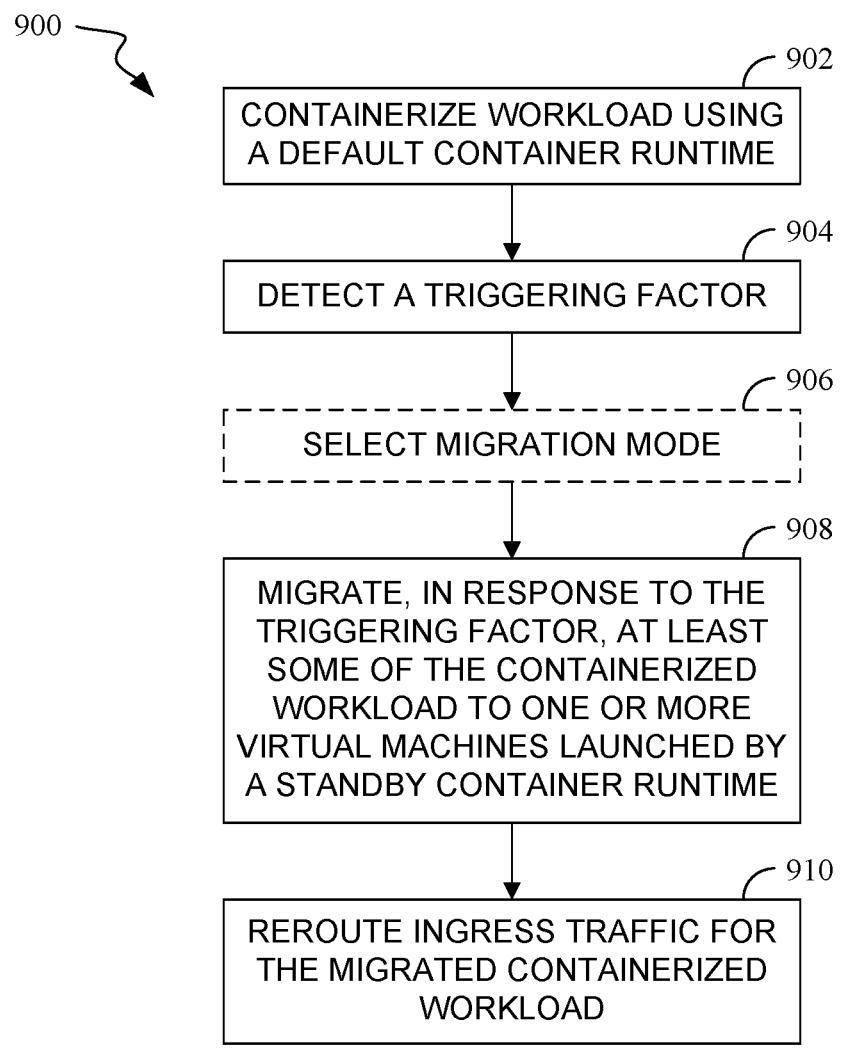
FIG. 9 is a flow diagram of an illustrative method of dynamically changing the isolation of containerized workload in response to detection of a triggering factor by live migrating the cgroups and namespaces of a plurality of running containers from host to a plurality of virtual machines using CRIU, according to one or more embodiments.

FIG. 9 is a flow diagram of an illustrative method 900 of dynamically changing the isolation of containerized workload in response to detection of a triggering factor by live migrating the cgroups and namespaces of a plurality of running containers from host to a plurality of virtual machines using CRIU, according to one or more embodiments. The method 900 sets forth the preferred order of the blocks. It must be understood, however, that the various blocks may occur at any time relative to one another.

The method 900 begins by containerizing workload using a default container runtime (e.g., runC) (block 902). For example, the default container runtime may spawn one or more cgroup-based containers on a compute node using resource limiting capabilities of the compute node's host kernel including cgroups and namespaces. The default container runtime may be runC or any other suitable default container runtime. Suitable default container runtimes include, but are not limited to, OCI-compatible container runtimes that use Linux cgroups and namespaces to provide isolation. In some embodiments, runC (or any other suitable default container runtime) on a compute node may spawn one or more cgroup-based containers on that compute node in response to a request from an agent on that compute node that listens for instructions from a container orchestration manager (COM) with regard to container lifecycle operations to be performed on that compute node (i.e., the agent sent the request to the default container runtime in response to receiving an instruction from the container orchestration manager (COM) for a container to be created on that compute node). In other embodiments, the default container runtime may receive the request from the agent indirectly through a CRI runtime (CRI shim), such as CRI-O, interposed between the agent and the default container runtime.

The method 900 continues with the detection of a triggering factor (block 904). Illustrative examples of a triggering factor include, but are not limited to, a threat perception (e.g., a host kernel vulnerability), change in a compliance requirement (e.g., a compliance requirement of a running service needs to be changed), and combinations thereof. For example, an administrator on the container orchestration manager (COM) may become aware of a host kernel vulnerability through a monitoring service. In response to the perceived kernel vulnerability, the administrator on the COM may decide it prudent to change the isolation of at least some of the containerized workload. For example, the administrator of the COM may initiate a standby container runtime that launches one or more virtual machines to which is then moved at least some of the containerized workload. In some embodiments, depending upon the vulnerability, the administrator on the COM may choose to move the complete workload into VM based container runtime or choose to horizontally scale containers across regular cgroup and namespace based container runtimes and VM based container runtimes by leveraging load balancing (optional block 906, described below).

Optionally, the method 900 continues with the selection of a complete migration mode or a partial migration mode (block 906). Block 906 is illustrated in FIG. 9 using a dashed line to denote optionality. For example, based on one or more traits associated with the triggering factor (e.g., the severity of a host kernel vulnerability detected in block 904), the administrator on the COM may select either a complete migration mode (i.e., all of the containerized workload is moved into VM based container runtime) or a partial migration mode (i.e., the containerized workload is horizontally scale across regular cgroup and namespace based container runtimes and VM based container runtimes by leveraging load balancing).

Next, the method 900 continues by migrating, in response to detection of the triggering factor in block 904 (and, optionally, selection of a migration mode in block 906), at least some of the containerized workload running in one or more cgroup-based containers spawned by the default container runtime to one or more virtual machines launched by a standby container runtime (e.g., runV) (block 908). In some embodiments, in response to detection of the triggering factor, the COM may automatically send an instruction for an "isolation-changing container migration" to be performed on the compute node. In other embodiments, in response to detection of the triggering factor, the administrator on the COM may decide whether or not it is prudent to change the isolation of at least some of the containerized workload. In the case where the administrator on the COM decides it is prudent to change the isolation of at least some of the containerized workload, the administrator on the COM may cause the COM to send an instruction for an "isolation-changing container migration" to be performed on the compute node.

The "isolation-changing container migration" instruction, whether sent automatically or at the behest of the administrator on the COM, initiates a standby container runtime, such as runV, that launches one or more virtual machines on the compute node, and then live migration of the cgroups and the namespaces of each of at least one of the one or more cgroup-based containers running on the compute node to one or more VM runtimes on the one or more virtual machines. The cgroups and namespaces may be live migrated, for example, using Checkpoint/Restore in Userspace (CRIU). In accordance with one or more embodiments, the "isolation-changing container migration" instruction may contain a flag denoting whether a complete or partial migration mode was selected in optional block 906.

The standby container runtime may be runV or any other suitable standby container runtime. Suitable standby container runtimes include, but are not limited to, other hypervisor-based runtime implementations of the OCI runtime specification. In some embodiments, runV (or any other suitable standby container runtime) on a compute node may spawn one or more virtual machines on that compute node in response to a request from an agent on that compute node that listens for instructions from a container orchestration manager (COM) with regard to container lifecycle operations to be performed on that compute node (i.e., the agent sent the request to the standby container runtime in response to receiving an instruction from the container orchestration manager (COM) for an "isolation-changing container migration" to be performed on that compute node). In other embodiments, the default container runtime may receive the request from the agent indirectly through a CRI runtime (CRI shim), such as CRI-O, interposed between the agent and the default container runtime.

As noted above, in accordance with one or more embodiments, the "isolation-changing container migration" instruction may contain a flag denoting whether a complete migration mode or a partial migration mode was selected in optional block 906. In other words, the migration of workload from regular cgroup runtime to VM based container runtime may be complete (i.e., 100% of workload migrated) or partial (i.e., <100% of workload migrated). In accordance with one or more embodiments, this dynamic switching of container runtime based on a perceived threat (or a compliance requirement change) occurs without service interruption.

On one hand, if the value of the instruction's flag denotes a complete migration mode was selected in optional block 906, the "isolation-changing container migration" instruction initiates a standby container runtime that launches one or more virtual machines on the compute node, and then live migration of the cgroups and the namespaces of each of the one or more cgroup-based containers running on the compute node to one or more VM runtimes on the one or more virtual machines.

On the other hand, if the value of the instruction's flag denotes a partial migration mode was selected in optional block 906, the "isolation-changing container migration" instruction initiates a standby container runtime that launches one or more virtual machines on the compute node, an then live migration of the cgroups and the namespaces of each of a subset of the one or more cgroup-based containers running on the compute node to one or more VM runtimes on the one or more virtual machines. Partial migration may facilitated by, for example, horizontally scaling containers across regular cgroups runtimes and VM runtimes.

The method 900 then continues by rerouting ingress traffic for the migrated containerized workload to the one or more VM runtimes (block 910). For example, an Ingress traffic controller may be configured to reroute the ingress traffic (originally destined for the migrated regular cgroup and namespace based container runtimes) to the VM based container runtimes without affecting service uptime. In one or more embodiments where the migration of workload from regular cgroup and namespace based container runtimes to VM based container runtimes was complete (i.e., 100% of workload migrated), the ingress traffic controller may reroute all ingress traffic to the VM based container runtimes. In one or more embodiments where the migration of workload from regular cgroup and namespace based container runtimes to VM based container runtimes was partial (i.e., <100% of the workload migrated), the ingress traffic controller may reroute to the VM based container runtimes only ingress traffic that was originally destined for the migrated regular cgroup runtimes.

Moreover, in accordance with one or more embodiments, the block 910 rerouting of ingress traffic for the migrated containerized workload may make use of traffic shaping via service-mesh. An example of a container orchestration system that employs traffic shaping via service-mesh is illustrated in FIG. 10, described below.

Figure 10:
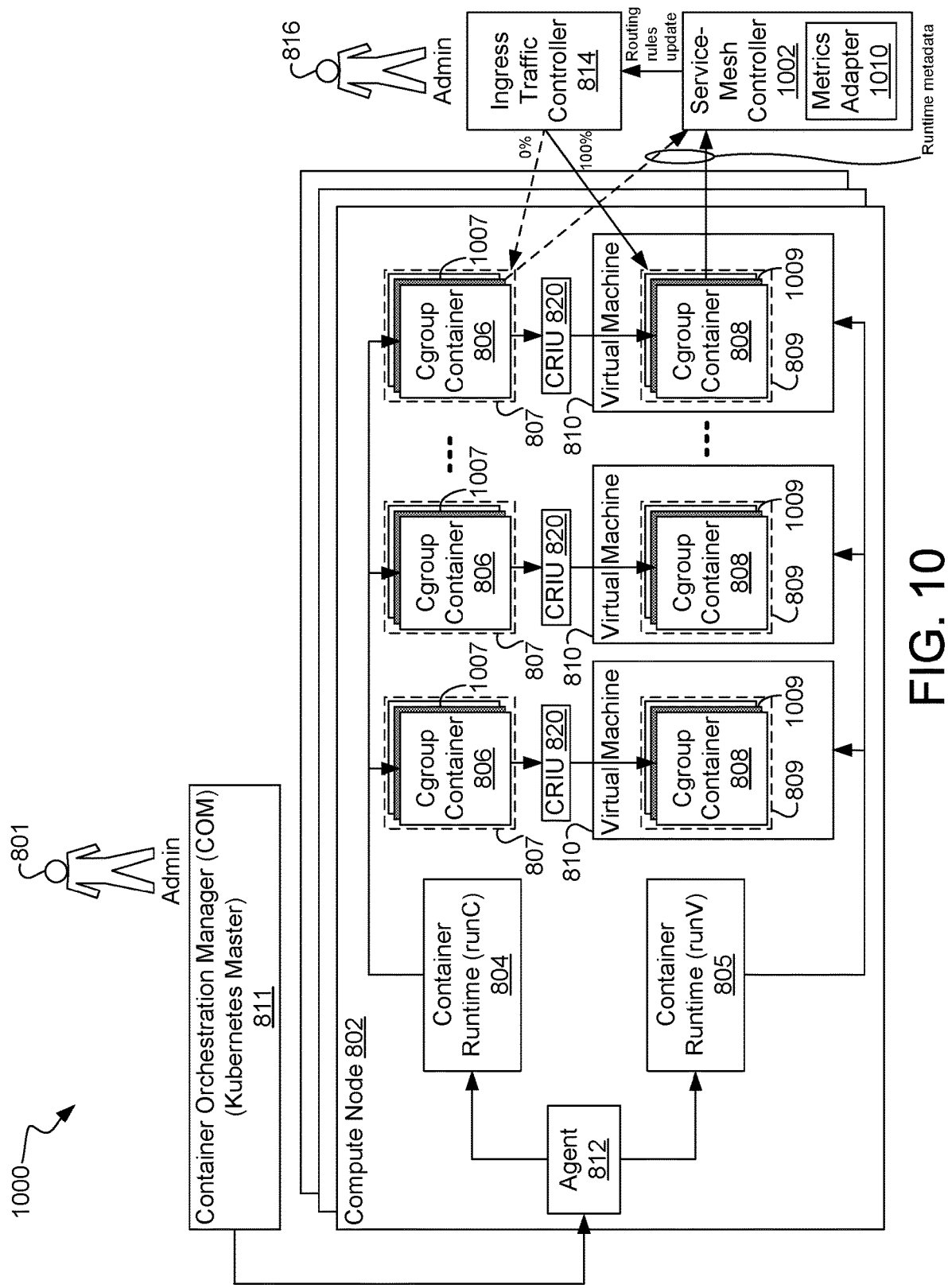
FIG. 10 illustrates a container orchestration system corresponding to the container orchestration system of FIG. 8 but that additionally employs traffic shaping via service-mesh, according to one or more embodiments.

FIG. 10 illustrates a container orchestration system 1000 that corresponds to the container orchestration system 800 of FIG. 8 but additionally employs traffic shaping via service-mesh, according to one or more embodiments. When containers switch runtimes (i.e., containers switch from regular cgroup and namespace based container runtimes to VM based container runtimes), runtime metadata about the containers (i.e., including, but not limited to, a runtime change event) from one or more service-mesh sidecars 1009 (also referred to as "sidecar containers") are sent to a "central controller" (e.g., a service-mesh controller 1002) to ensure container-runtime related decisions can be made. In the embodiment illustrated in FIG. 10, each pod 807 (with regular cgroup and namespace based container runtimes) includes a sidecar container 1007 and each pod 809 (with VM based container runtimes) includes a sidecar container 1009 (in FIG. 10, the sidecar container in each pod is shaded to distinguish the sidecar container from other containers in the pod). In accordance with one or more embodiments, the service-mesh controller 1002 may send routing rules updates to the ingress traffic controller 814 based on the runtime metadata that the service-mesh controller 1002 receives from the service-mesh sidecars 1009.

To create service-mesh, two logical components are needed. The first logical component needed to create service-mesh is pods. Pods are designed to have many containers. The second logical component needed to create service-mesh is a container referred to as a "sidecar" (e.g., container sidecar 1009). With service-mesh, each pod includes one or more sidecar containers. Sidecar extends and enhances the primary container in a pod. For example, a sidecar container may monitor something on the primary container and perform one or more tasks on data flowing from the monitoring operation, thereby alleviating the primary container of that responsibility. With service-mesh, the sidecar may be service proxy or data plane.

Service-mesh on Kubernetes may be created using service-mesh solutions such as Istio and Linkerd (created by Buoyant). In such service-mesh solutions, a "central controller" in the service-mesh (e.g., service-mesh controller 1002) defines how each sidecar container works (with the exception of sidecar proxies).

In accordance with one or more embodiments, various traffic shaping policies may be added to the service-mesh by setting up priority levels for different runtimes. For example, in one or more embodiments, the service-mesh controller 1002 may generate service-mesh routing policy changes based on whether runtime metadata is being received from regular cgroup and namespace based container runtimes (e.g., runC) or VM based container runtimes (e.g., runV).

In accordance with one or more embodiments, a "central controller" in the service-mesh (e.g., the service-mesh-controller 1002) shapes the traffic based on new metrics (i.e., runtime metadata) now being fetched from the new container runtime. This may happen dynamically, as in, the metrics provider for the service-mesh is switched at the runtime depending upon the container runtime engine. For example, in the embodiment illustrated in FIG. 10, the metrics provider for the service-mesh is switched at the runtime from sidecar containers 1007 (with regular cgroup and namespace based container runtimes) to sidecar containers 1009 (with VM based container runtimes). Accordingly, the "central controller" in the service-mesh (e.g., the service-mesh-controller 1002) may be equipped with a metrics adapter 1010 that handles this change transparently.

In accordance with one or more embodiments, in response to the new metrics (i.e., runtime metadata) indicating that the VM based container runtimes are becoming overburdened, the service-mesh controller 1002 may generated a service-mesh routing policy that a certain percentage of ingress traffic is to be rerouted to another node (i.e., instead of being rerouted to the VM based container runtimes).

In FIG. 10, in accordance with one or more embodiments, CRIU 820 can be made optional for a subset of the blocks (i.e., at least one but not all of the blocks depicted in FIG. 10 as CRIU 820). Without CRIU, container runtime switching can be accomplished by starting the workload in VM (e.g. VM 810) spawned by a standby container runtime with suitable modification to the ingress traffic controller (e.g., ingress traffic controller 814) rules to route all traffic to the VM (depicted in FIG. 10 as 0% traffic to cgroup and namespace based container runtimes and 100% traffic to VM based container runtimes).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. For example, the particular hardware and software implementation details (namely using the Linux kernel) described herein are merely for illustrative purposes and are not meant to limit the scope of the described subject matter. Thus, while the present invention has been particularly shown and described with reference to preferred embodiments thereof, it will be understood by those skilled in the art that changes in form and details may be made therein without departing from the spirit and scope of the present invention.

What is claimed is:

1. A method of changing containerized workload isolation in a system having one or more compute nodes each having a host kernel, the method comprising:
    containerizing workload using a default container runtime, wherein the default container runtime spawns one or more cgroup-based containers on a compute node using resource limiting capabilities of the compute node's host kernel including cgroups and namespaces;
    migrating, in response to detection of a triggering factor, at least some of the containerized workload running in the one or more cgroup-based containers spawned by the default container runtime to one or more virtual machines (VMs) launched by a standby container runtime, wherein the triggering factor is selected from the group consisting of a perceived threat, a compliance requirement change, and combinations thereof, wherein migrating at least some of the containerized workload includes:
    initiating the standby container runtime;
    live migrating the cgroups and the namespace of each of at least one of the one or more cgroup-based containers running on the compute node to one or more VM runtimes on the one or more VMs.

2. The method as recited in claim 1, wherein migrating at least some of the containerized workload is performed without service interruption.

3. The method as recited in claim 1, wherein the default container runtime is a cgroup and namespace based container runtime.

4. The method as recited in claim 3, wherein the standby container runtime is a VM based container runtime.

5. The method as recited in claim 1, wherein the standby container runtime is VM based container runtime.

6. The method as recited in claim 1, wherein live migrating the cgroups and the namespace of each of at least one of the one or more cgroup-based containers running on the compute node to one or more VM runtimes on the one or more VMs includes invoking checkpoint/restore in userspace (CRIU), the method further comprising:
    rerouting ingress traffic, for the at least some of the containerized workload migrated, to the one or more VM runtimes.

7. The method as recited in claim 6, further comprising:
    switching container runtime of a subset of the containerized workload running in the one or more cgroup-based containers spawned by the default container runtime by starting the workload in one or more virtual machines (VMs) spawned by a standby container runtime, wherein switching does not include invoking CRIU;
    rerouting ingress traffic, for the subset of the containerized workload switched, to the workload started in the one or more VM runtimes.

8. The method as recited in claim 1, further comprising:
    detecting the triggering factor;
    selecting either a complete migration mode or a partial migration mode based on one or more traits associated with the triggering factor.

9. The method as recited in claim 8, wherein migrating at least some of the containerized workload includes:
    initiating the standby container runtime;
    live migrating the cgroups and the namespace of each of the one or more cgroup-based containers running on the compute node to one or more VM runtimes on the one or more VMs in response to selecting the complete migration mode.

10. The method as recited in claim 8, wherein migrating at least some of the containerized workload includes:
    initiating the standby container runtime;
    live migrating the cgroups and the namespace of each of a subset of the one or more cgroup-based containers running on the compute node to one or more VM runtimes on the one or more VMs in response to selecting the partial migration mode.

11. The method as recited in claim 10, wherein live migrating the cgroups and the namespace of each of a subset of the one or more cgroup-based containers running on the compute node to one or more VM runtimes on the one or more VMs in response to selecting the partial migration mode includes horizontally scaling containers across regular cgroups runtimes and VM runtimes by leveraging load balancing.

12. The method as recited in claim 1, further comprising:
receiving, at a service-mesh controller, runtime metadata sent from one or more service-mesh sidecars associated with the one or more VM runtimes on the one or more VMs;
updating, at the service-mesh controller, routing rules based on the runtime metadata and sending updated routing rules to an ingress traffic controller;
routing ingress traffic, at the ingress traffic controller, based on the updated routing rules.

13. A computer system for changing containerized workload isolation, the computer system comprising:
one or more processors, one or more computer readable storage devices, and program instructions stored on at least one of the one or more computer readable storage devices for execution by at least one of the one or more processors, the program instructions executable to:
containerize workload using a default container runtime, wherein the default container runtime spawns one or more cgroup-based containers on a compute node using resource limiting capabilities of a host kernel of the compute node including cgroups and namespaces;
migrate, in response to detection of a triggering factor, at least some of the containerized workload running in the one or more cgroup-based containers spawned by the default container runtime to one or more virtual machines (VMs) launched by a standby container runtime, wherein the triggering factor is selected from the group consisting of a perceive threat, a compliance requirement change, and combinations thereof, wherein the program instructions executable to migrate at least some of the containerized workload include program instructions executable to initiate the standby container runtime and live migrate the cgroups and the namespace of each of at least one of the one or more cgroup-based containers running on the compute node to one or more VM runtimes on the one or more VMs.

14. The computer system as recited in claim 13, further comprising the program instructions executable to reroute ingress traffic, for the at least some of the containerized workload migrated, to the one or more VM runtimes.

15. The computer system as recited in claim 13, further comprising the program instructions executable to:
receive, at a service-mesh controller, runtime metadata sent from one or more service-mesh sidecars associated with the one or more VM runtimes on the one or more VMs;
update, at the service-mesh controller, routing rules based on the runtime metadata and sending updated routing rules to an ingress traffic controller;
route ingress traffic, at the ingress traffic controller, based on the updated routing rules.

16. A computer program product for changing containerized workload isolation in a system having one or more compute nodes each having a host kernel, the computer program product comprising a computer readable storage medium having program code embodied therewith, the program code executable by a processor, to perform a method comprising:
containerizing workload using a default container runtime, wherein the default container runtime spawns one or more cgroup-based containers on a compute node using resource limiting capabilities of the compute node's host kernel including cgroups and namespaces;
migrating, in response to detection of a triggering factor, at least some of the containerized workload running in the one or more cgroup-based containers spawned by the default container runtime to one or more virtual machines (VMs) launched by a standby container runtime, wherein the triggering factor is selected from the group consisting of a perceived threat, a compliance requirement change, and combinations thereof, wherein migrating at least some of the containerized workload includes initiating the standby container runtime and live migrating the cgroups and the namespace of each of at least one of the one or more cgroup-based containers running on the compute node to one or more VM runtimes on the one or more VMs;
rerouting ingress traffic, for the at least some of the containerized workload migrated, to the one or more VM runtimes.

17. The computer program product as recited in claim 16, wherein the method further comprises:
receiving, at a service-mesh controller, runtime metadata sent from one or more service-mesh sidecars associated with the one or more VM runtimes on the one or more VMs;
updating, at the service-mesh controller, routing rules based on the runtime metadata and sending updated routing rules to an ingress traffic controller;
routing ingress traffic, at the ingress traffic controller, based on the updated routing rules.

\* \* \* \* \*